United States Patent
Dropps et al.

(10) Patent No.: US 7,822,057 B2
(45) Date of Patent: *Oct. 26, 2010

(54) METHOD AND SYSTEM FOR KEEPING A FIBRE CHANNEL ARBITRATED LOOP OPEN DURING FRAME GAPS

(75) Inventors: Frank R. Dropps, Maple Grove, MN (US); Ernest G. Kohlwey, Eagan, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/191,890

(22) Filed: Aug. 14, 2008

(65) Prior Publication Data

US 2009/0046736 A1 Feb. 19, 2009

Related U.S. Application Data

(63) Continuation of application No. 10/894,491, filed on Jul. 20, 2004, now Pat. No. 7,420,982.

(51) Int. Cl.
*H04L 12/56* (2006.01)
(52) U.S. Cl. ........................ 370/424; 370/528
(58) Field of Classification Search .......... 370/227, 370/389, 401–405, 410, 412, 424, 440, 445, 370/461, 528; 709/240; 710/241; 702/54
See application file for complete search history.

(56) References Cited

U.S. PATENT DOCUMENTS

| | | | |
|---|---|---|---|
| 4,200,929 A | * | 4/1980 | Davidjuk et al. .............. 702/57 |
| 4,691,296 A | | 9/1987 | Struger |
| 4,964,119 A | | 10/1990 | Endo et al. |
| 5,025,370 A | * | 6/1991 | Koegel et al. ................ 710/241 |
| 5,051,742 A | * | 9/1991 | Hullett et al. ................ 370/412 |

(Continued)

FOREIGN PATENT DOCUMENTS

WO    WO-01/95566    12/2001

(Continued)

OTHER PUBLICATIONS

"Office Action from USPTO dated Jan. 6, 2010 for U.S. Appl. No. 10/956,501".

(Continued)

*Primary Examiner*—Kwang B Yao
*Assistant Examiner*—Andrew Lai
(74) *Attorney, Agent, or Firm*—Klein, O'Neill & Singh, LLP

(57) ABSTRACT

A method and system for keeping an arbitrated loop open during a frame gap using a fiber channel switch element is provided. The switch element includes a port control module having a receive and transmit segment, wherein the transmit segment activates a timer whose value determines a duration during which the arbitrated loop remains open; determines if a last frame from a sequence of frames from a source port has been transmitted; modifies the timer value if a higher priority frame for transmission is unavailable; and keeps the arbitrated loop open until the timer reaches a certain value. If a higher priority frame is available for transmission before the timer value is modified then the higher priority frame is transmitted and the timer value is re-initialized.

23 Claims, 10 Drawing Sheets

U.S. PATENT DOCUMENTS

| | | | |
|---|---|---|---|
| 5,115,430 A * | 5/1992 | Hahne et al. ............... 370/440 |
| 5,151,899 A | 9/1992 | Thomas et al. |
| 5,258,751 A | 11/1993 | DeLuca et al. |
| 5,280,483 A | 1/1994 | Kamoi et al. |
| 5,291,481 A | 3/1994 | Doshi et al. |
| 5,425,022 A | 6/1995 | Clark et al. |
| 5,568,167 A | 10/1996 | Galbi et al. |
| 5,579,443 A | 11/1996 | Tatematsu et al. |
| 5,638,518 A | 6/1997 | Malladi |
| 5,677,909 A | 10/1997 | Heide |
| 5,687,387 A | 11/1997 | Endejan et al. |
| 5,751,710 A | 5/1998 | Crowther et al. |
| 5,757,771 A | 5/1998 | Li et al. |
| 5,764,927 A | 6/1998 | Murphy et al. |
| 5,784,358 A | 7/1998 | Smith et al. |
| 5,790,545 A | 8/1998 | Holt et al. |
| 5,822,300 A | 10/1998 | Johnson et al. |
| 5,835,748 A | 11/1998 | Orenstein et al. |
| 5,892,604 A | 4/1999 | Yamanaka et al. |
| 5,925,119 A | 7/1999 | Maroney |
| 6,009,226 A | 12/1999 | Tsuji et al. |
| 6,011,779 A | 1/2000 | Wills |
| 6,046,979 A | 4/2000 | Bauman |
| 6,061,360 A * | 5/2000 | Miller et al. ............... 370/455 |
| 6,118,791 A | 9/2000 | Fichou et al. |
| 6,131,123 A | 10/2000 | Hurst et al. |
| 6,147,976 A | 11/2000 | Shand et al. |
| 6,148,421 A | 11/2000 | Hoese et al. |
| 6,158,014 A | 12/2000 | Henson |
| 6,185,203 B1 | 2/2001 | Berman |
| 6,278,708 B1 | 8/2001 | Von Hammerstein et al. |
| 6,286,011 B1 | 9/2001 | Velamuri et al. |
| 6,307,857 B1 | 10/2001 | Yokoyama et al. |
| 6,310,884 B1 | 10/2001 | Odenwald, Jr. |
| 6,311,204 B1 | 10/2001 | Mills |
| 6,314,477 B1 | 11/2001 | Cowger et al. |
| 6,333,932 B1 | 12/2001 | Kobayasi et al. |
| 6,335,935 B2 | 1/2002 | Kadambi et al. |
| 6,339,813 B1 | 1/2002 | Smith et al. |
| 6,397,360 B1 | 5/2002 | Bruns |
| 6,404,749 B1 | 6/2002 | Falk |
| 6,418,477 B1 * | 7/2002 | Verma ..................... 709/240 |
| 6,421,342 B1 | 7/2002 | Schwartz et al. |
| 6,438,628 B1 | 8/2002 | Messerly et al. |
| 6,480,500 B1 | 11/2002 | Erimli et al. |
| 6,509,988 B1 | 1/2003 | Saito |
| 6,522,656 B1 | 2/2003 | Gridley |
| 6,553,036 B1 | 4/2003 | Miller et al. |
| 6,563,796 B1 | 5/2003 | Saito |
| 6,622,206 B1 | 9/2003 | Kanamaru et al. |
| 6,625,157 B2 | 9/2003 | Niu et al. |
| 6,629,161 B2 | 9/2003 | Matsuki et al. |
| 6,643,298 B1 | 11/2003 | Brunheroto et al. |
| 6,684,209 B1 | 1/2004 | Ito et al. |
| 6,697,914 B1 | 2/2004 | Hospodor et al. |
| 6,700,877 B1 | 3/2004 | Lorenz et al. |
| 6,765,871 B1 | 7/2004 | Knobel et al. |
| 6,779,083 B2 | 8/2004 | Ito et al. |
| 6,865,155 B1 | 3/2005 | Wong et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 | 8/2005 | Acharya et al. |
| 6,947,393 B2 | 9/2005 | Hooper, III |
| 6,975,627 B1 | 12/2005 | Parry et al. |
| 6,983,342 B2 | 1/2006 | Helenic et al. |
| 6,987,768 B1 | 1/2006 | Kojima et al. |
| 7,024,410 B2 | 4/2006 | Ito et al. |
| 7,031,615 B2 | 4/2006 | Genrile |
| 7,076,569 B1 | 7/2006 | Bailey et al. |
| 7,082,126 B2 | 7/2006 | Ain et al. |
| 7,120,728 B2 | 10/2006 | Krakirian et al. |
| 7,150,021 B1 | 12/2006 | Vajjhala et al. |
| 7,187,688 B2 | 3/2007 | Garmire et al. |
| 7,200,610 B1 | 4/2007 | Prawdiuk et al. |
| 7,209,478 B2 | 4/2007 | Rojas et al. |
| 7,233,570 B2 | 6/2007 | Gregg |
| 7,239,641 B1 | 7/2007 | Banks et al. |
| 7,245,627 B2 | 7/2007 | Goldenberg et al. |
| 7,263,593 B2 | 8/2007 | Honda et al. |
| 7,266,286 B2 | 9/2007 | Tanizawa et al. |
| 7,269,168 B2 | 9/2007 | Roy et al. |
| 7,275,103 B1 | 9/2007 | Thrasher et al. |
| 7,277,431 B2 | 10/2007 | Walter et al. |
| 7,310,389 B2 | 12/2007 | Waschura et al. |
| 7,315,511 B2 * | 1/2008 | Morita et al. ............... 370/227 |
| 7,319,669 B1 | 1/2008 | Kunz et al. |
| 7,334,046 B1 | 2/2008 | Betker |
| 7,346,707 B1 | 3/2008 | Erimli |
| 7,349,399 B1 | 3/2008 | Chen et al. |
| 7,352,701 B1 | 4/2008 | Kunz |
| 7,352,740 B2 | 4/2008 | Hammons et al. |
| 7,362,702 B2 | 4/2008 | Terrell et al. |
| 7,397,788 B2 | 7/2008 | Mies et al. |
| 7,406,034 B1 | 7/2008 | Cometto et al. |
| 7,406,092 B2 | 7/2008 | Dropps et al. |
| 7,424,533 B1 | 9/2008 | Di Benedetto et al. |
| 7,443,794 B2 | 10/2008 | George et al. |
| 7,460,534 B1 | 12/2008 | Ballenger |
| 7,466,700 B2 | 12/2008 | Dropps et al. |
| 7,471,691 B2 | 12/2008 | Black et al. |
| 7,492,780 B1 | 2/2009 | Goolsby |
| 2001/0033552 A1 | 10/2001 | Barrack et al. |
| 2001/0043564 A1 | 11/2001 | Bloch et al. |
| 2002/0067726 A1 | 6/2002 | Ganesh et al. |
| 2002/0118692 A1 | 8/2002 | Oberman et al. |
| 2002/0122428 A1 | 9/2002 | Fan et al. |
| 2002/0124102 A1 | 9/2002 | Kramer et al. |
| 2002/0124124 A1 * | 9/2002 | Matsumoto et al. ......... 710/105 |
| 2002/0174197 A1 | 11/2002 | Schimke et al. |
| 2003/0002516 A1 | 1/2003 | Boock et al. |
| 2003/0012200 A1 | 1/2003 | Salamat |
| 2003/0033487 A1 | 2/2003 | Pfister et al. |
| 2003/0037159 A1 | 2/2003 | Zhao et al. |
| 2003/0063567 A1 | 4/2003 | Dehart |
| 2003/0091062 A1 | 5/2003 | Lay et al. |
| 2003/0112819 A1 | 6/2003 | Kofoed et al. |
| 2003/0115355 A1 | 6/2003 | Cometto et al. |
| 2003/0118053 A1 | 6/2003 | Edsall et al. |
| 2003/0120791 A1 | 6/2003 | Weber et al. |
| 2003/0131105 A1 | 7/2003 | Czeiger et al. |
| 2003/0139900 A1 | 7/2003 | Robison |
| 2003/0152076 A1 | 8/2003 | Lee et al. |
| 2003/0172149 A1 | 9/2003 | Edsall et al. |
| 2003/0179748 A1 | 9/2003 | George et al. |
| 2003/0179755 A1 | 9/2003 | Fraser |
| 2003/0189935 A1 | 10/2003 | Warden et al. |
| 2003/0191883 A1 | 10/2003 | April |
| 2003/0198238 A1 | 10/2003 | Westby |
| 2003/0200315 A1 | 10/2003 | Goldenberg et al. |
| 2004/0013113 A1 | 1/2004 | Singh et al. |
| 2004/0027989 A1 | 2/2004 | Martin et al. |
| 2004/0042458 A1 | 3/2004 | Elzu |
| 2004/0054776 A1 | 3/2004 | Klotz et al. |
| 2004/0064664 A1 | 4/2004 | Gil |
| 2004/0081196 A1 | 4/2004 | Elliott |
| 2004/0085974 A1 | 5/2004 | Mies et al. |
| 2004/0092278 A1 | 5/2004 | Diepstraten et al. |
| 2004/0107389 A1 | 6/2004 | Brown et al. |
| 2004/0120340 A1 | 6/2004 | Furey et al. |
| 2004/0125799 A1 | 7/2004 | Buer |
| 2004/0141518 A1 | 7/2004 | Milligan et al. |

| | | |
|---|---|---|
| 2004/0153566 A1 | 8/2004 | Lalsangi et al. |
| 2004/0153863 A1 | 8/2004 | Klotz et al. |
| 2004/0202189 A1 | 10/2004 | Arndt et al. |
| 2004/0218531 A1 | 11/2004 | Cherian et al. |
| 2005/0025152 A1 | 2/2005 | Georgiou et al. |
| 2005/0036485 A1 | 2/2005 | Eilers et al. |
| 2005/0047334 A1 | 3/2005 | Paul et al. |
| 2005/0099970 A1 | 5/2005 | Halliday |
| 2005/0108444 A1 | 5/2005 | Flauaus et al. |
| 2005/0111845 A1 | 5/2005 | Nelson et al. |
| 2005/0188245 A1 | 8/2005 | Seto et al. |
| 2005/0286526 A1 | 12/2005 | Sood et al. |
| 2006/0034302 A1 | 2/2006 | Peterson |
| 2006/0143300 A1 | 6/2006 | See et al. |
| 2006/0274744 A1 | 12/2006 | Nagai et al. |

OTHER PUBLICATIONS

"Office Action from State Intellectual Property Office dated Dec. 4, 2009 for Chinese Application No. 200580032947.X".
"Notice of Allowance from USPTO dated Jan. 21, 2010 for U.S. Appl. No. 10/894,547".
"Office Action from USTPO dated Jan. 26, 2010 for U.S. Appl. No. 10/956,501".
"Final Office Action from USPTO dated Feb. 12, 2010 for U.S. Appl. No. 10/894,732".
"Final Office Action from USPTO dated Mar. 4, 2010 for U.S. Appl. No. 10/957,465".
"Office Action from USPTO dated Mar. 29, 2010 for U.S. Appl. No. 12/189,502".
"Final Office Action from USPTO dated Apr. 29, 2008 for U.S. Appl. No. 10/894,491".
"Office Action USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Office Action from USPTO dated May 27, 2008 for U.S. Appl. No. 10/956,955".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Office Action from USPTO dated Sep. 23, 2008 for U.S. Appl. No. 12/031,585".
"Project-T11/1619-D/Rev. 0.50", *Information technology Industry Council, Fibre Channel: Framing and Signaling-2*, Dec. 2004, Rev. 0.50,76, 81,114, 115.
"Notice of Allowance fnom the USPTO dated Sep. 29, 2008 for U.S. Appl. No. 10/889,267".
"Office Action from USPTO dated Sep. 29, 2008 for U.S. Appl. No. 11/363,365".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action USPTO dated Jan. 7, 2009 for U.S. Appl. No. 10/894,586".
"Final Office Action from USPTO dated Jan. 26, 2009 for US Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for US Appl. No. 12/031,585".

"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated Apr. 27, 2009 for U.S. Appl. No. 11/363,365".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Office Action dated Jun. 19, 2009 from State Intellectual Property Office for Chinese U.S. Application No. 200580032948.4".
"Office Action from USPTO dated Sep. 8, 2009 for U.S. Appl. No. 11/743,852".
"Final Office Action from USPTO dated Sep. 15, 2009 for U.S. Appl. No. 10/956,501".
"Office Action from USPTO dated Sep. 25, 2009 for U.S. Appl. No. 11/682,199".
"Final Office Action from USPTO dated Oct. 26, 2009 for U.S. Appl. No. 10/894,546".
"Notice of Allowance from USPTO dated Nov. 2, 2009 for U.S. Appl. No. 12/189,497".
"Final Office Action from USPTO dated Nov. 10, 2009 for U.S. Appl. No. 11/057,912".
"Office Action from USPTO dated Dec. 2, 2009 for U.S. Appl. No. 12/141,519".
"Office Action from China State Intellectual Property Office dated Dec. 11, 2009 for Chinese Application No. 200580032948.4".
"Notice of Allowance from USPTO dated Apr. 7, 2010 for U.S. Appl. No. 11/682,199".
"Communication Under Rule 71(3) EPC indicating allowance of application dated Apr. 9, 2010 from European Patent Office for European Application No. 05798761.2".
"Notification of Grant of Patent from the State Intellectual Property Office of P.R.C. dated Mar. 25, 2010 for Chinese Application No. 200580032948.4".
"Office Action from USPTO dated May 27, 2010 for U.S. Appl. No. 12/267,188".
"Notice of Allowance from USPTO dated May 28, 2010 for U.S. Appl. No. 12/141,519".
"Office Action from State Intellectual Property Office of China dated May 20, 2010 for Chinese Application No. 200580032947.X".
"Office Action from USPTO dated Jun. 10, 2010 for U.S. Appl. No. 12/259,197".
"Notice of Allowance from USPTO dated Jul. 19, 2010 for U.S. Appl. No. 10/894,546".
"Final Office Action from USPTO dated Aug. 16, 2010 for U.S. Appl. No. 10/956,501".
"Notice of Allowance from USPTO dated Aug. 19, 2010 for U.S. Appl. No. 12/267,188".
"Notice of Allowance from USPTO dated Aug. 18, 2010 for U.S. Appl. No. 10/957,465".

* cited by examiner

METHOD AND SYSTEM FOR KEEPING A FIBRE CHANNEL ARBITRATED LOOP OPEN DURING FRAME GAPS

CROSS REFERENCE TO RELATED APPLICATIONS

This patent application is a continuation of U.S. patent application Ser. No. 10/894,491, filed Jul. 20, 2004, now U.S. Pat. No. 7,420,982 that claims priority under 35 U.S.C.§119 (e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled" Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network"

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches"

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane"

Filed on Dec. 29, 2003, Ser. No. 60/532,966, entitled "Method And System For Using Extended Fabric Features With Fibre Channel Switch Elements"

Filed on Mar. 4, 2004, Ser. No. 60/550,250, entitled "Method And System for Programmable Data Dependent Network Routing"

Filed on May 7, 2004, Ser. No. 60/569,436, entitled "Method And System For Congestion Control In A Fibre Channel Switch"

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to a process and system for keeping an arbitrated loop open during frame gaps.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fire channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received (at receive buffers) and sent across (via transmit buffers) a network. Associated with these buffers are credits, which are the number of frames that a buffer can hold per fabric port.

During an arbitrated loop mode, many cycles are wasted while arbitrating for the loop, or opening a device on the loop. If a sequence of frames had to go through arbitration and "OPEN" (as defined by the fibre channel standards), it could take more time arbitrating than keeping the loop open and waiting for the next frame of the sequence to arrive in the receive buffer.

Conventional switches do not stay open through frame gaps, and hence during the arbitrated loop mode when frames are coming from the same source in sequence, conventional switches are inefficient.

Therefore, there is a need for a process and system that can keep a loop open for a finite period of time during frame gaps so that entire sequence of frames can be delivered with only one OPEN.

SUMMARY OF THE INVENTION

In one aspect of the present invention, a method for keeping an arbitrated loop open during a frame gap using a fibre channel switch element is provided. The method includes, activating a timer whose value determines a duration during which the arbitrated loop remains open; determining if a last frame from a sequence of frames from a source port has been transmitted; modifying the timer value if a higher priority frame for transmission is unavailable; and keeping the arbitrated loop open until the timer reaches a certain value.

If a higher priority frame is received, when the arbitrated loop is being held open, the higher priority frame is transmitted without regard to the timer value. If a higher priority frame is available for transmission before the timer value is modified then the higher priority frame is transmitted and the timer value is re-initialized. If a frame from the same source is available, then it is transmitted before the timer value is modified. The timer value may be pre-programmed by a processor.

In yet another aspect of the present invention, a fibre channel switch element coupled to an arbitrated loop of a fibre channel network is provided. The switch element includes a port control module having a receive and transmit segment, wherein the transmit segment activates a timer whose value determines a duration during which the arbitrated loop remains open; determines if a last frame from a sequence of frames from a source port has been transmitted; and modifies the timer value if a higher priority frame for transmission is unavailable; and keeps the arbitrated loop open until the timer reaches a certain value.

In yet another aspect of the present invention, an arbitration module in fibre channel switch element with a port control module having a receive and transmit segment coupled to an arbitrated loop of a fibre channel network is provided. The arbitration module includes, a loop hold timer whose value determines a duration during which the arbitrated loop remains open; determines if a last frame from a sequence of frames from a source port has been transmitted; and modifies the timer value if a higher priority frame for transmission is unavailable; and keeps the arbitrated loop open until the timer reaches a certain value.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively used in the fibre channel environment, implementing the various adaptive aspects of the present invention.

"EOF": End of Frame

"E-Port": A fabric expansion port that attaches to another Interconnect port to create an Inter-Switch Link.

"F-Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one off more NL_Ports in an Arbitrated Loop topology.

"Inter-Switch Link": A Link directly connecting the E_port of one switch to the E_port of another switch.

Port: A general reference to N. Sub.—Port or F.Sub.—Port.

"L_Port": A port that contains Arbitrated Loop functions associated with the Arbitrated Loop topology.

"N-Port": A direct fabric attached port.

"NL_Port": A L-Port that can perform the function of a N_Port.

"SOF": Start of Frame

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
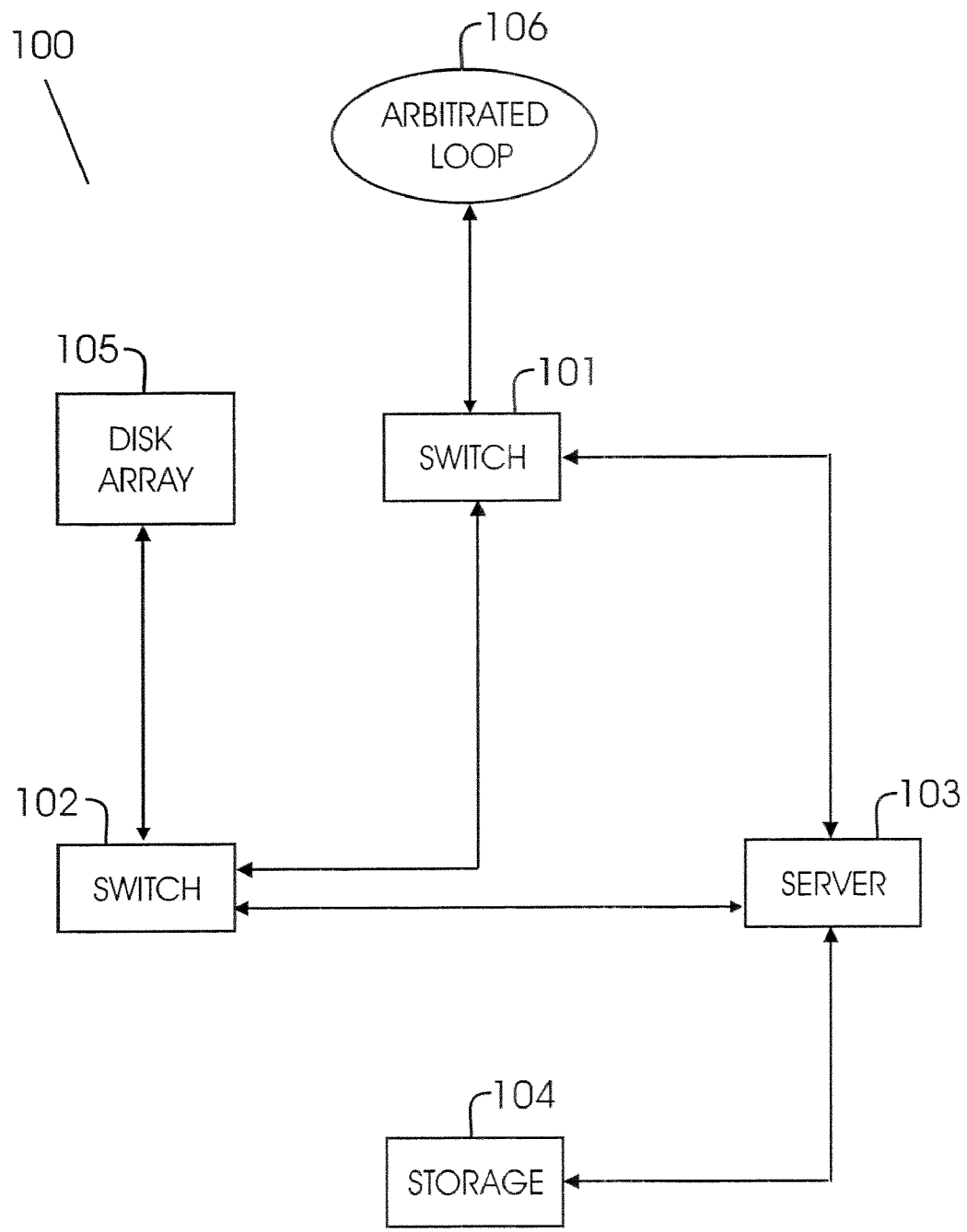
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 105 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
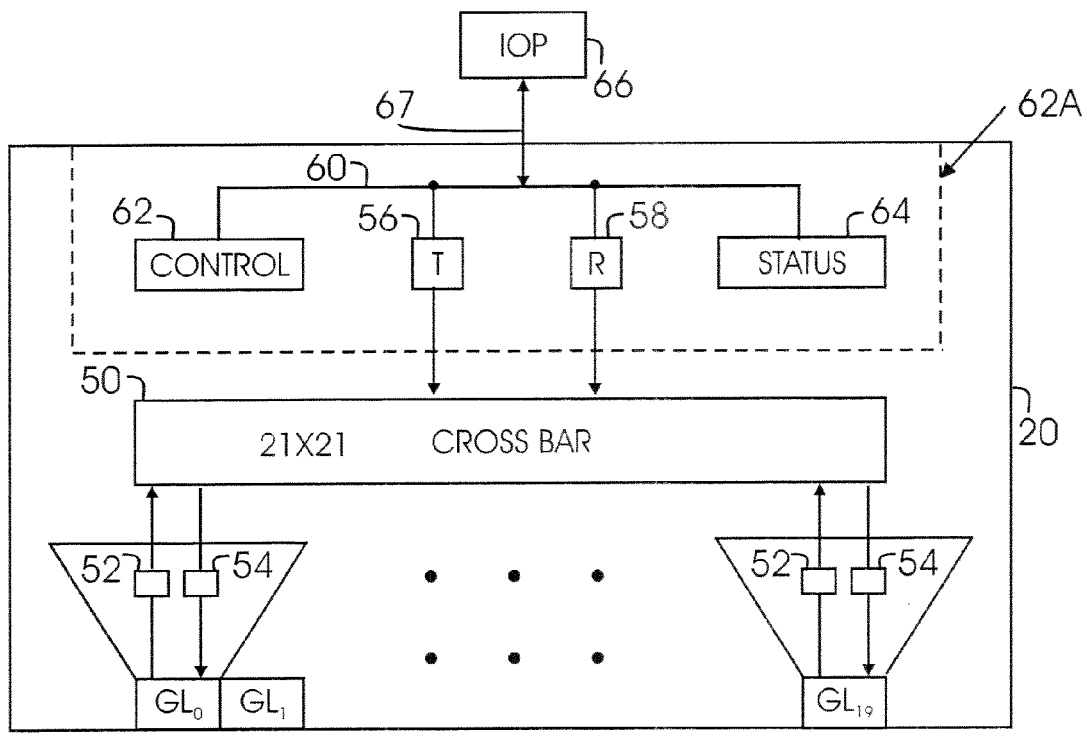
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CUSS ASIC, and for this reason the term "fabric elements" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each CL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar.

Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
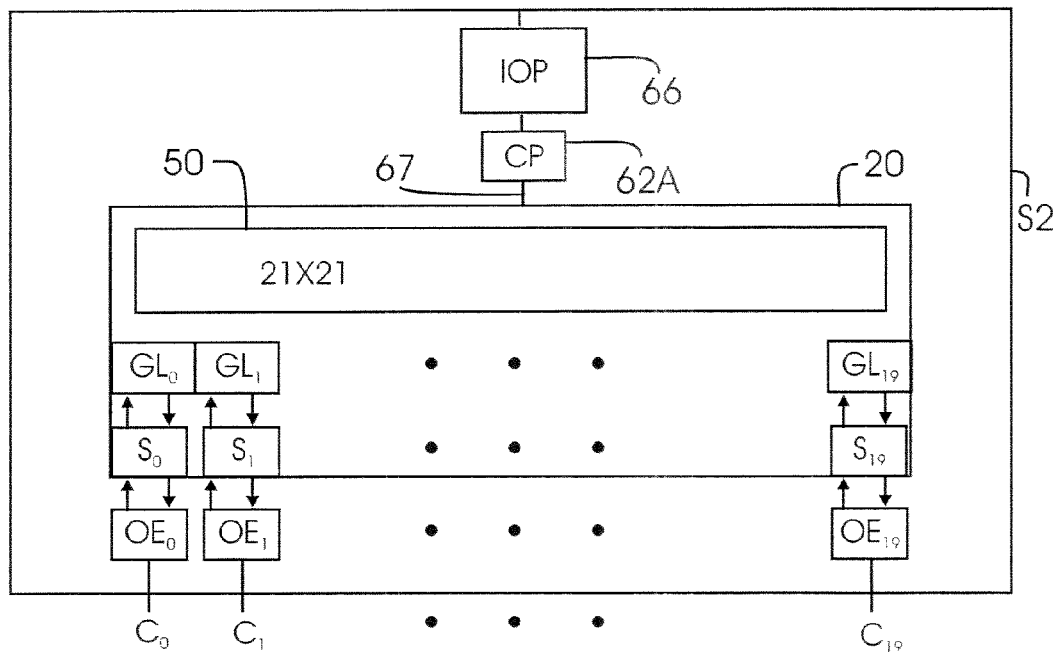
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP". IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. OP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel C0-C19. Each GL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
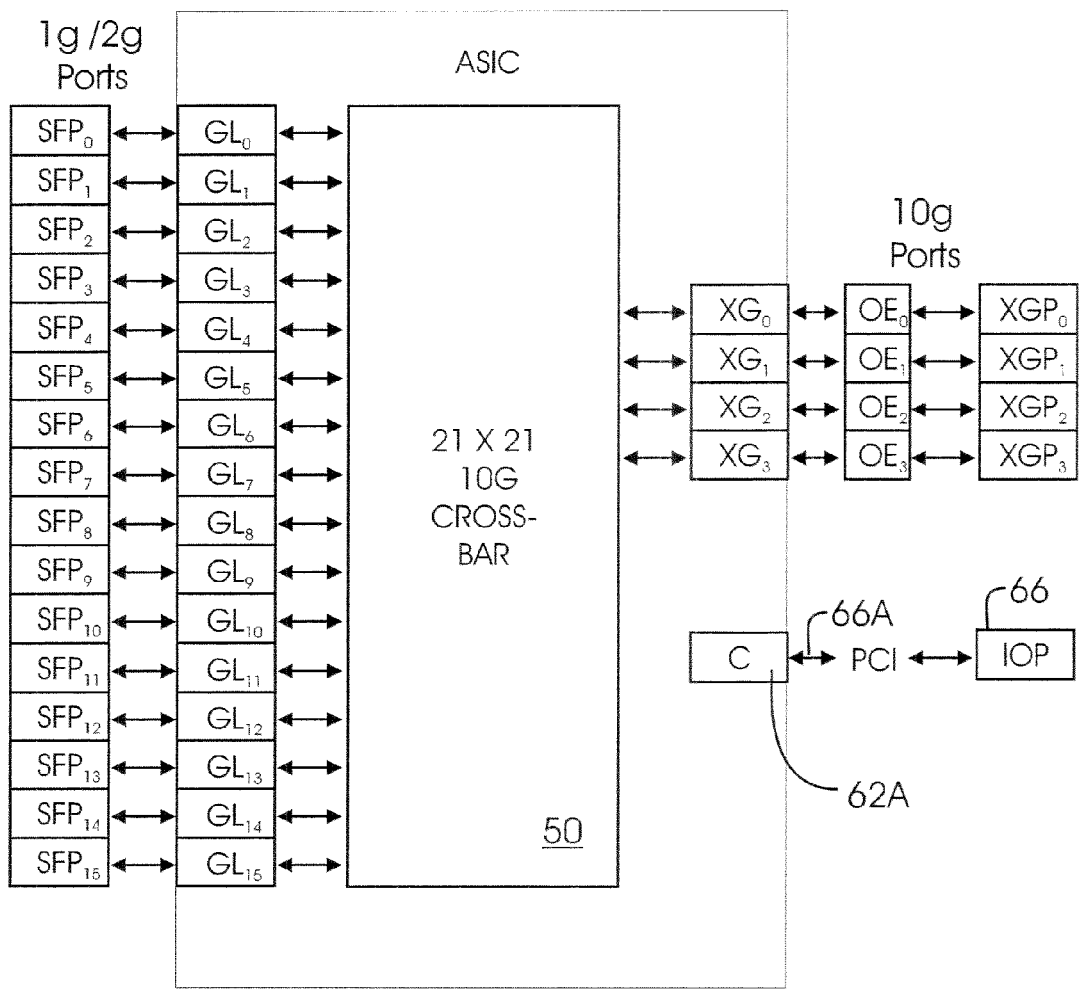
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figures 1, 1E:
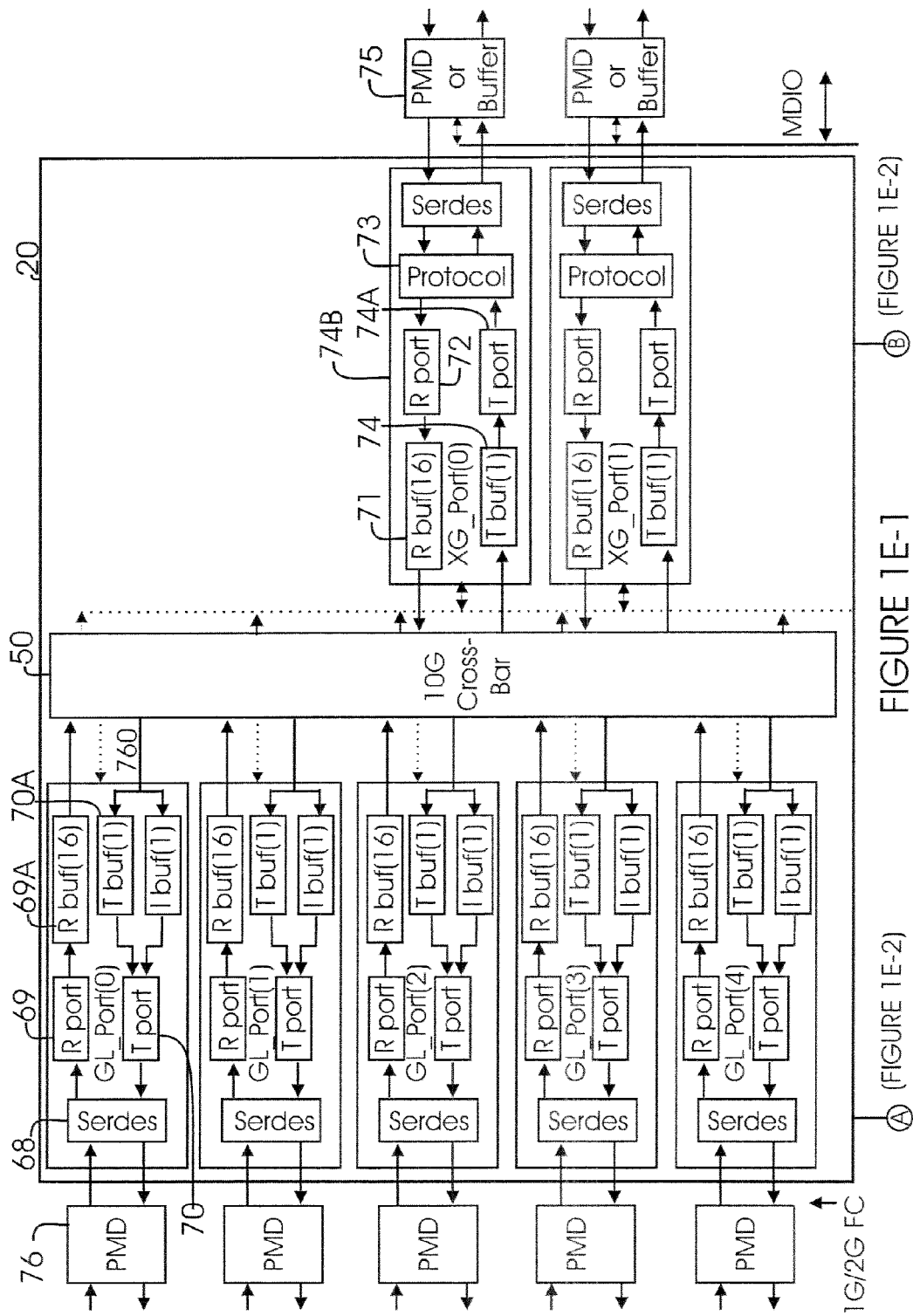
FIGS. 1E-1/1E-2 (jointly referred to as FIG. 1E) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD) 76 and 75 respectively.

Control port module 62A includes control buffers 62B and 62D for receive and transmit sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
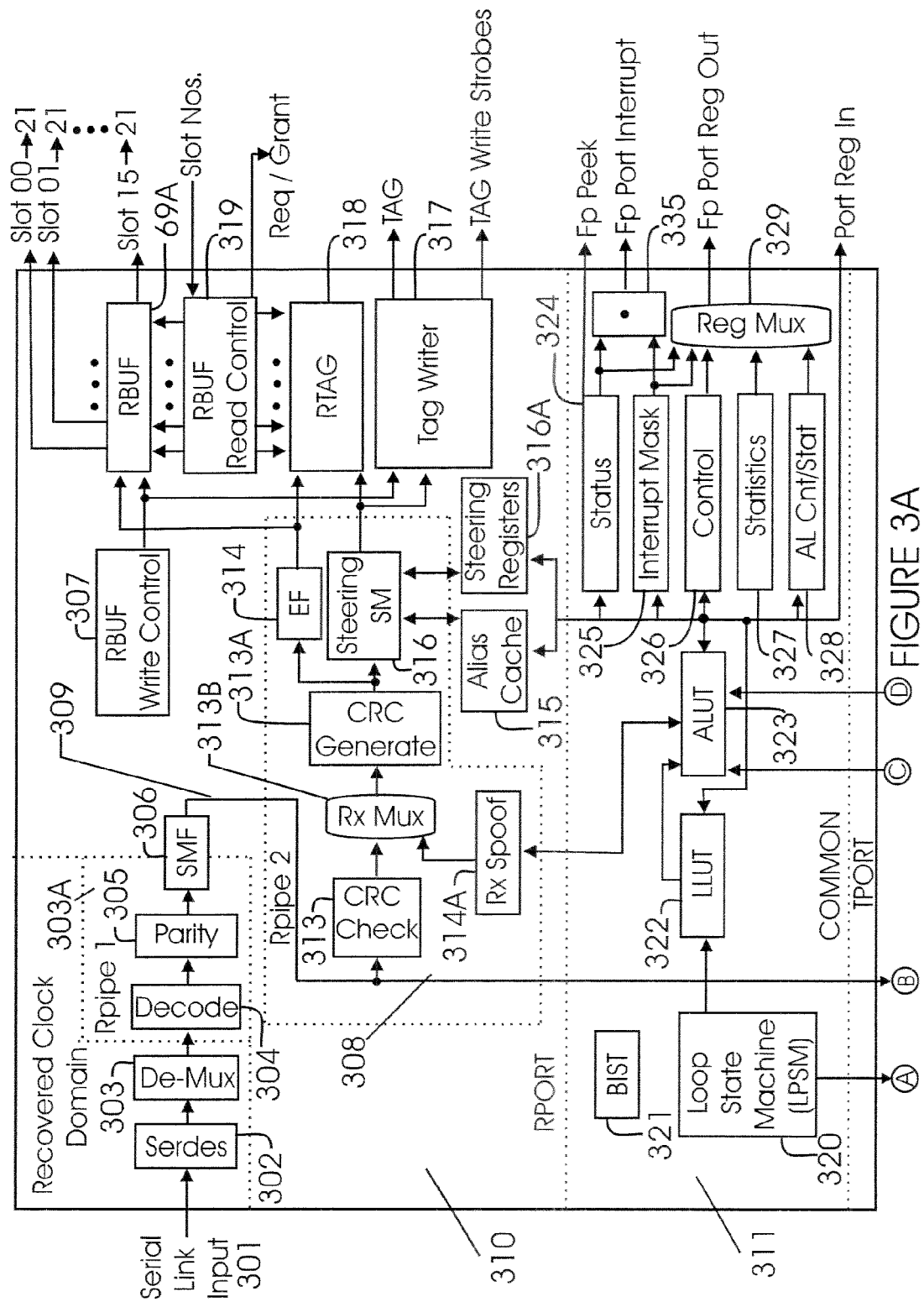
FIGS. 3A/3B (jointly referred to as FIG. 3) show a block diagram of a GL_Port, according to one aspect of the present invention.
Figure 3B:
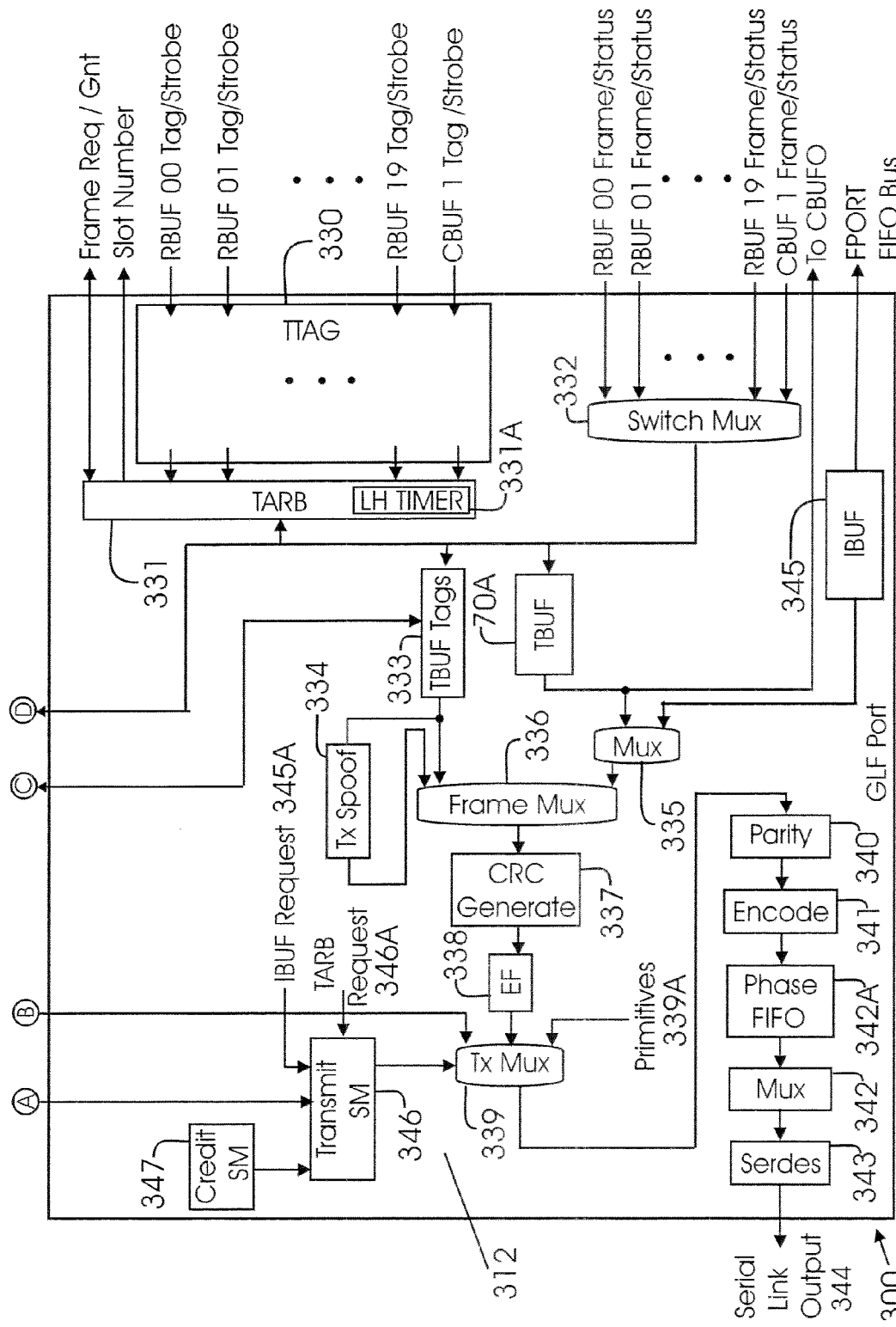

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT), 312 and common segment 311.

Receive Segment of GL Port:

Frames enter through link 301 and SERDES 302 converts data into 10-bit parallel data to fibre channel characters, which are then sent to receive pipe ("Rpipe") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF0), end-of frame (EOF), Idles, R_RDYs (fibre channel standard primitive) and the like, which are not described since they are standard functions.

Rpipe 303A connects to smoothing FIFE (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 63A are controlled by RBUF read control logic (RRD) 319 and RBUF write control logic (RWT) 307, respectively. RWT 307 specifies which empty RBUF 69A slot will be written into when a frame arrives through the data link via multiplexer 313B, CRC generate module 313A and EF module 314. EF (external proprietary format) module 314 encodes proprietary (i.e. non-standard) format frames to standard Fibre Channel 8B codes. Mux 313B receives input from Rx Spoof module 314A, which encodes frames to an proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty ands available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then rears the tag. For any given source, there are as many entries in TTAG 330 as there are credits in RBUF 69A.

TARB 331 is activated anytime there are one or more valid frame tags in TTAG 330 TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate Slot number. The output from Switch Mux 332 is sent to ALUT 323 for S_ID spoofing and the result is fed into TBUF Tags 333.

TMUX 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A. TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides LOP 66 the means for transmitting frames for special purposes.

Frame multiplexer ("Mux") 336 chooses the frame source, while logic (TX spoof 3341 converts D_ID and S_ID from public to private addresses. Mux 336 receives input from Tx Spoof module 334, TBUF tags 333, and Mux 335 to select a frame source for transmission.

EF (external proprietary format; module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
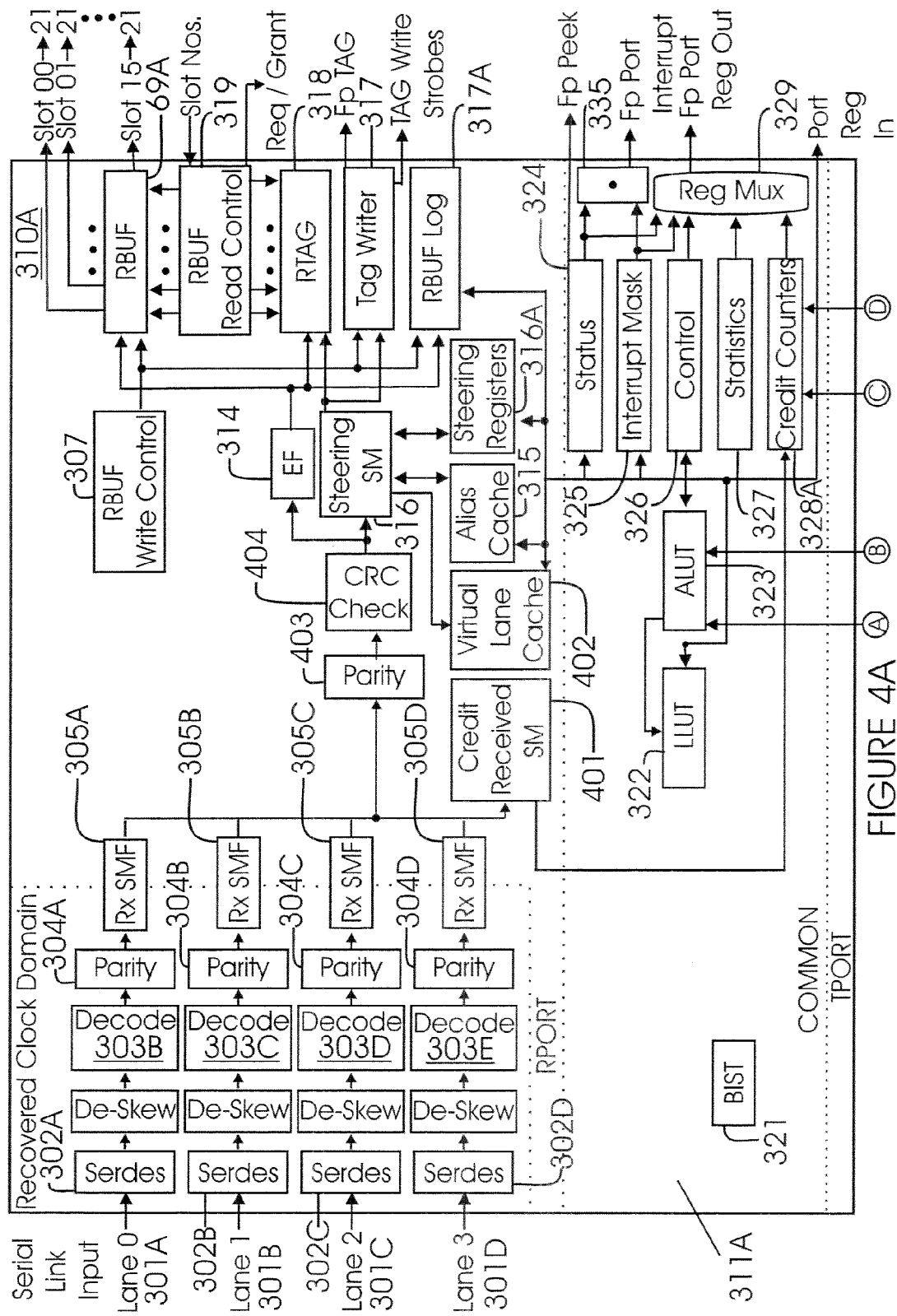
FIGS. 4A/4B (jointly referred to as FIG. 3) show a block diagram of XG_Port (10 G) port, according to one aspect of the present invention.
Figure 4B:
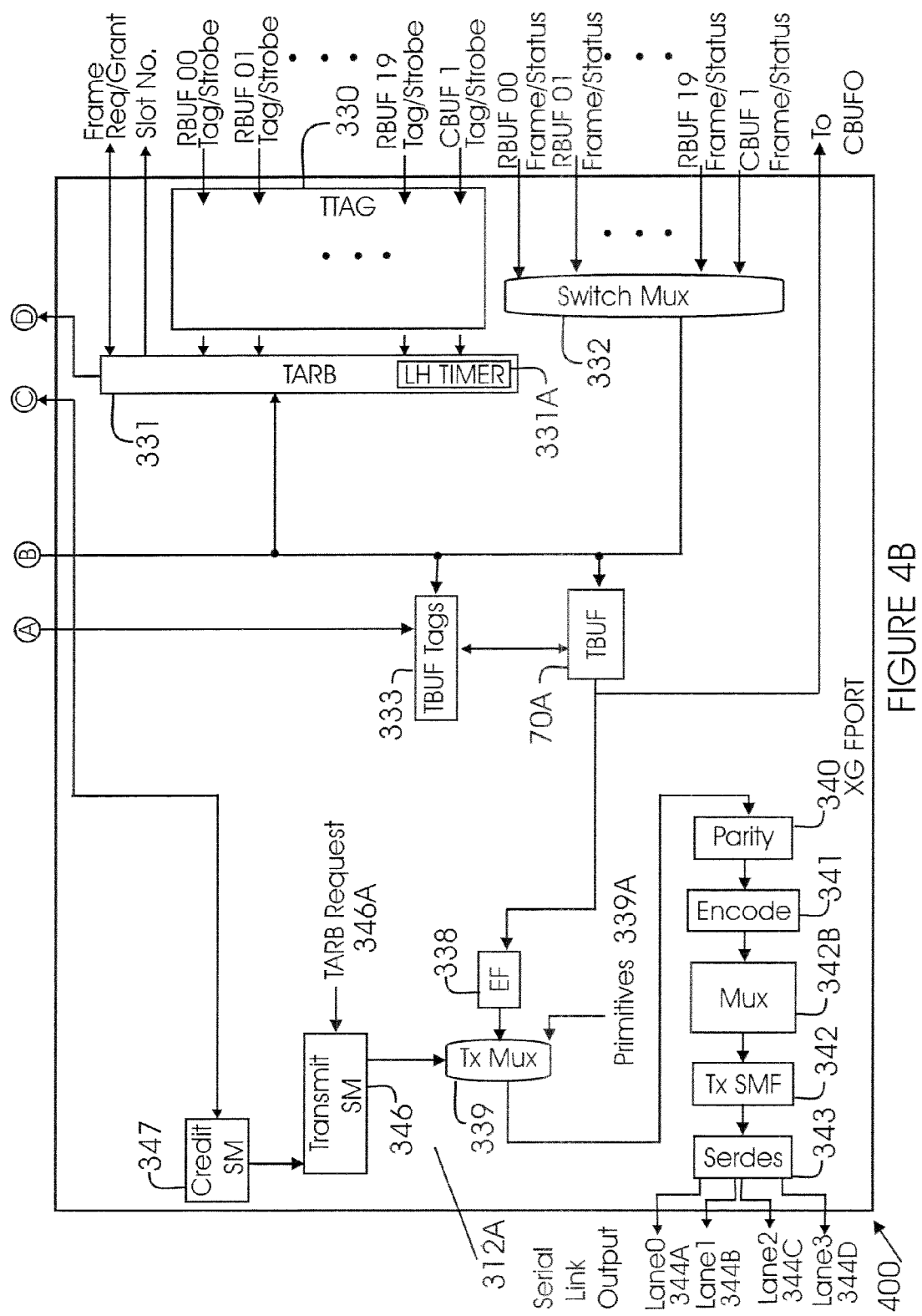

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-332D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a SMF module 342 that handles clock variation on the transmit side. SERDES 343 then sends the data out to the link.

Loop Hold Timer Process:

In one aspect of the present invention a loop hold timer system 331A (also referred to herein as "loop hold timer 331A" or "timer 331 A") is provided. System 331A has a counter and is located in TARB 331. The loop hold timer 331A counter allows a transmit port to wait during a frame gap, e.g., when there is a delay in a sequence of frames arriving from a certain source port. This is achieved by preventing other source ports from being selected for frame transfers during this time.

The loop hold timer 331A has a programmable control bit to enable its operation. It is enabled when a multiple frame sequence policy is programmed to lock on a source port, and when arbitrated loop is enabled. This is used in FL_Port.

In one aspect of the present invention, an eight-bit control register is written by firmware to set the wait time for the loop hold timer 331A. When a frame is first selected to be transferred, the loop hold timer 331A is loaded with the programmed control register value times X (for example, 2). Throughout the frame transfer the value in the timer 331A does not change.

After the transfer is completed and if there are no valid frames available from the same source, timer 331A begins to decrement (or increase, depending upon how the time value is programmed). Valid frames from other source ports are ignored during this "decrement" period. Timer 331A will continue to decrement until a valid frame from the source port arrives, or until the timer 331A decrements down to zero. If a valid frame from the source port arrives during the decrement period, the same loading and decrement process will be repeated.

If timer 331A decrements down to zero (or reaches a certain value), TARB 331 is free to select a different source port from which to transfer frames.

The loading and decrementing process ends if a transferred frame is the last frame of a sequence. The end of the sequence lets TARE 331 select another source port.

The rate of the decrement for loop hold timer 331A changes with different transmit rates. For example, timer 331A will decrement once for every word transmission time at the transmit port. For 1 G-transfer rate it will decrement every 37.6 ns (nano second). For 2 G-transfer rate it will decrement every 18.8 ns. For 4 G-transfer rate it will decrement every 9.4 ns. For 8 G-transfer rate, the timer will decrement every 4.7 ns.

It is noteworthy, that the foregoing wait times are not intended to limit the adaptive aspects of the present invention.

Higher priority frame types can interrupt the loop hold waiting process. If a valid frame arrives in control port input buffer (CBUFI) 62B, then it will be selected and the waiting process is aborted.

If a Preference frame arrives in a different receive buffer (69A), then it is selected and the waiting process is aborted.

Figures 1, 1E, 2:
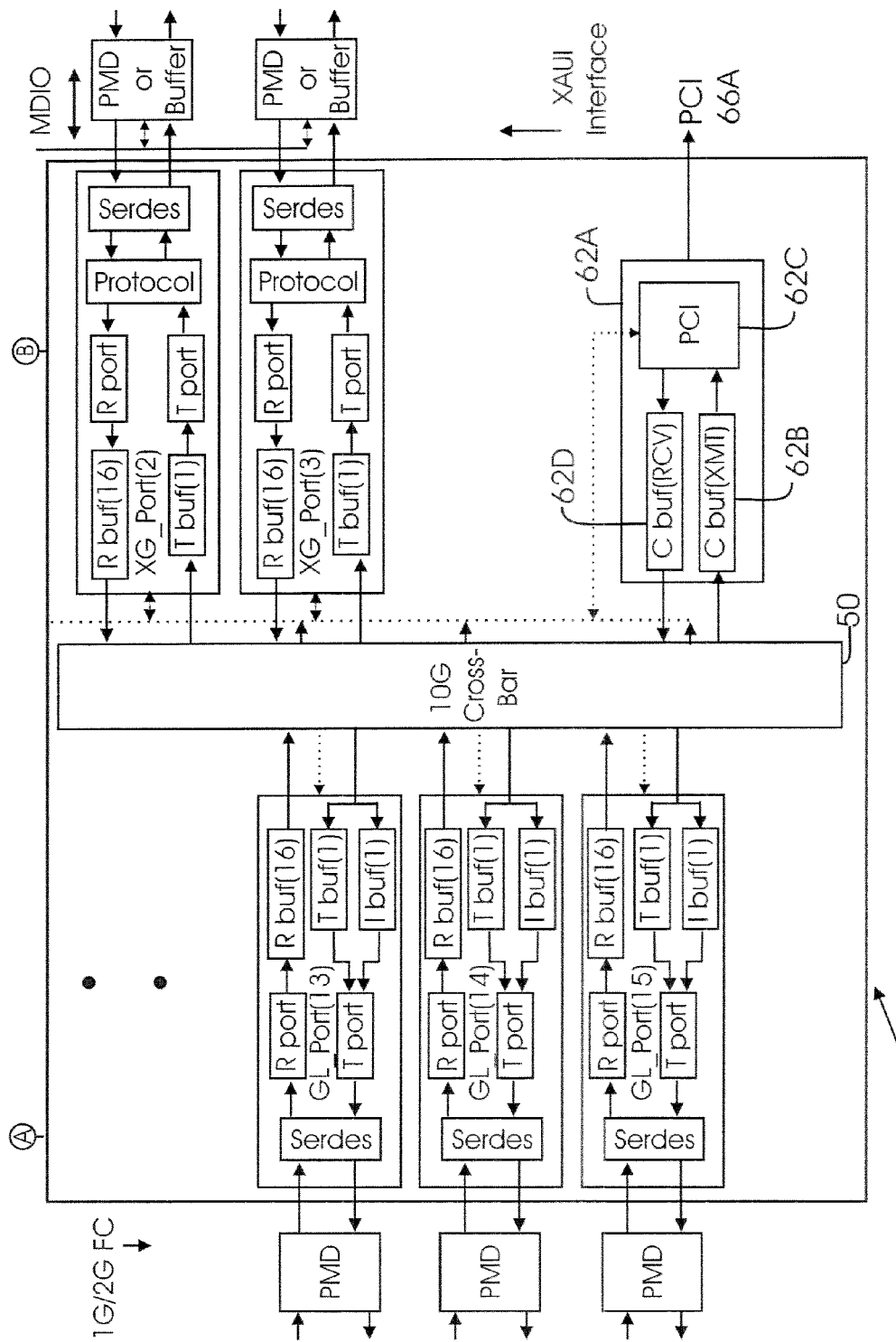
FIG. 2 is a flow diagram for using a loop hold timer, according to one aspect of the present invention.
Figure 2:
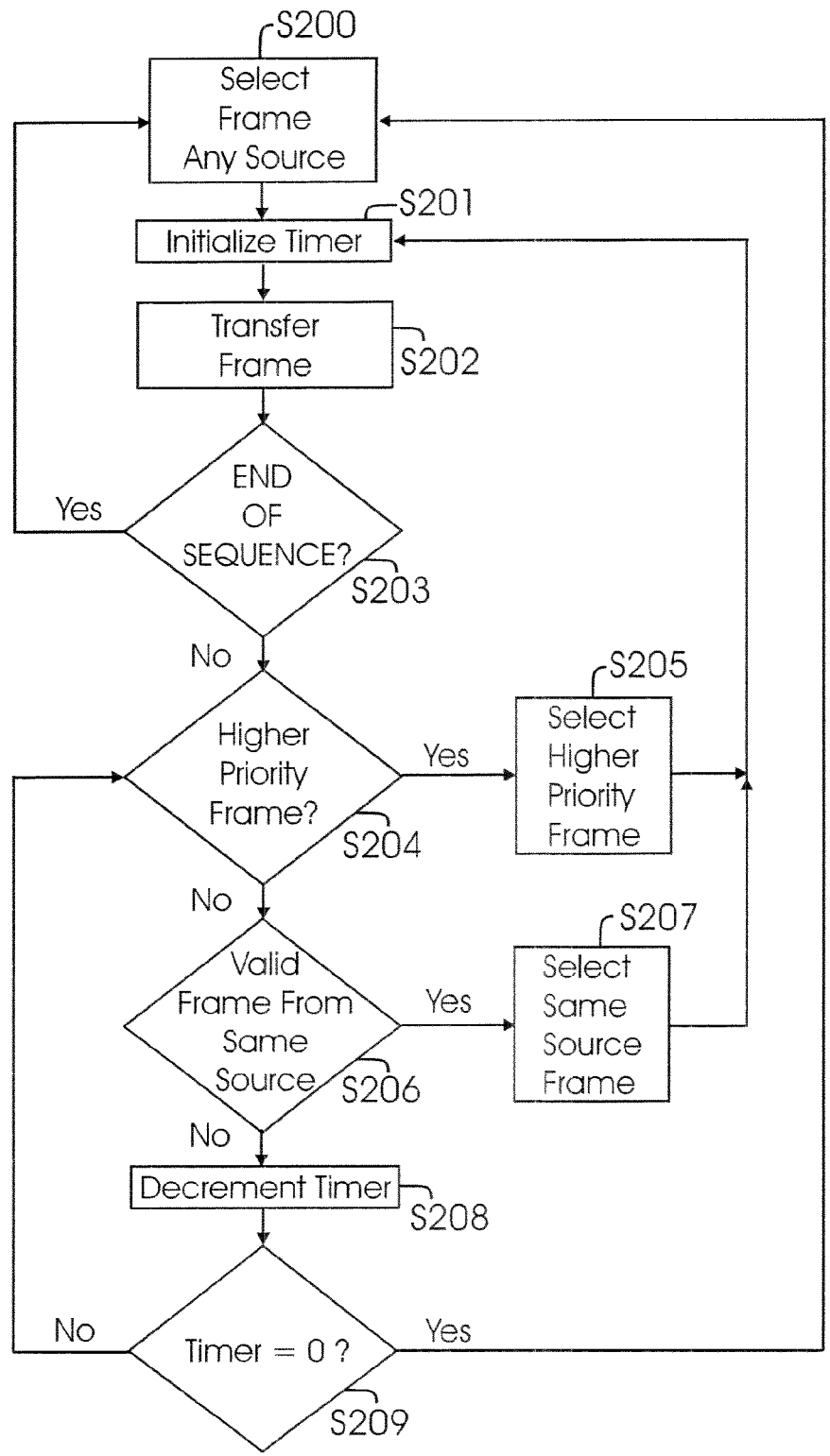

FIG. 2 is a flow diagram of process steps for using the loop hold timer 331A, according to one aspect of the present invention.

In step S200, a frame is selected for transfer from any source.

In step S201, the loop hold timer 331A is initialized to a firmware-programmed value. Processor 66 may be used to program this value.

In step S202, the selected frame is transferred.

In step S203, the process determines if the frame transferred is the last frame of a sequence. If it is, the process goes back to step S200.

If the frame is not the end of a sequence, then the process goes to step S204 to check for a higher priority frame. If there is a higher priority frame, it is selected in step S205 and the process moves to step S201.

If there is no higher priority frame, the process proceeds to step S206 to check for a frame from the same source as the last frame. If a frame is available, the process goes to step S207 to select the frame, and then the process reverts back to step S201.

If there is no frame available from the same source, the process proceeds to step S208 where the loop hold timer 331A is decremented. Then, in step S209, loop hold timer 331A time-out is tested. If there is no time-out, the process moves to step S204.

Timer 331A continues to decrement while the process loops through steps S204, S206, S208 and S209. This continues until either a higher priority frame or a frame from the same source becomes available, or timer 331A times out.

In step S209, if the timer 331A has timed out, the process reverts back to step S200 to select any source that may be available.

In one aspect of the present invention, waiting through a frame gap increases total bandwidth, when arbitrated loop is enabled by reducing loop arbitration time and/or disk access time.

Although the present invention has been described with reference to specific embodiments, these embodiments are illustrative only and not limiting. Many other applications and embodiments of the present invention will be apparent in light of this disclosure and the following claims.

What is claimed is:

1. A method for keeping an arbitrated loop open during a frame gap using a fibre channel switch element, comprising:
    activating a timer whose value determines a duration during which the arbitrated loop remains open;
    transferring a frame;
    determining if a last frame from a sequence of frames from a source port has been transmitted;
    during the frame gap, modifying the timer value; and
    keeping the arbitrated loop open during the frame gap until the timer reaches a certain value, wherein if a frame is received from the source port after the timer value is modified then the frame is transmitted and the timer value is reinitialized.

2. The method of claim 1, further comprising determining if a higher priority frame is available for transmission.

3. The method of claim 2, wherein during the frame gap if a higher priority frame is available for transmission the higher priority frame is transmitted without regard to the timer.

4. The method of claim 2, wherein if a higher priority frame is available for transmission before the timer value is modified then the higher priority frame is transmitted and the timer value is re-initialized.

5. The method of claim 2, wherein any frames received from other ports when the arbitrated loop is being held open, other than higher priority frames, are ignored.

6. The method of claim 1, wherein a frame from the source port, if available, is transmitted before the timer value is modified.

7. The method of claim 1, wherein the timer value is pre-programmed by using a processor.

8. A fibre channel switch element coupled to an arbitrated loop of a fibre channel network, comprising:
    a port control module having a receive and transmit segment;
    wherein the transmit segment is configured to activate a timer whose value determines a duration during which the arbitrated loop remains open, transfer a frame, determine if a last frame from a sequence of frames from a source port has been transmitted, during a frame gap, modify the timer value, and keep the arbitrated loop open during the frame gap until the timer reaches a certain value, wherein if a frame is received from the source port after the timer value is modified then the frame is transmitted and the timer value is reinitialized.

9. The fibre channel switch element of claim 8, wherein the transmit segment is further configured to determine if a higher priority frame is available for transmission.

10. The fibre channel switch element of claim 9, wherein the transmit segment is configured to modify the timer value only if no higher priority frame is available for transmission.

11. The fibre channel switch element of claim 9, wherein if a higher priority frame is received, when the arbitrated loop is being held open, the higher priority frame is transmitted without regard to the timer value.

12. The fibre channel switch element of claim 9, wherein if a higher priority frame is available for transmission before the timer value is modified then the higher priority frame is transmitted and the timer value is re-initialized.

13. The fibre channel switch element of claim 9, wherein any frames received from other ports when the arbitrated loop is being held open, other than higher priority frames, are ignored.

14. The fibre channel switch element of claim 8, wherein a frame from the source port, if available, is transmitted before the timer value is modified.

15. The fibre channel switch element of claim 8, wherein the timer value is pre-programmed by using a processor.

16. An arbitration module in a fibre channel switch element with a port control module having a receive segment and a transmit segment coupled to an arbitrated loop of a fibre channel network, comprising:
    a loop hold timer whose value determines a duration during which the arbitrated loop remains open;
    wherein the arbitration module is configured to determine if a last frame from a sequence of frames from a source port has been transmitted, during a frame gap, modify the timer value and keep the arbitrated loop open during the frame gap until the timer reaches a certain value, wherein if a frame is received from the source port after the timer value is modified then the frame is transmitted and the timer value is reinitialized.

17. The arbitration module of claim 16, wherein the arbitration module is further configured to determine if a higher priority frame is available for transmission.

18. The arbitration module of claim 17, wherein the arbitration module is configured to modify the timer value only if no higher priority frame is available for transmission.

19. The arbitration module of claim 17, wherein if a higher priority frame is received after the timer value is modified then the higher priority frame is transmitted and the timer value is re-initialized.

20. The arbitration module of claim 17, wherein if a higher priority frame is available for transmission before the timer value is modified then the higher priority frame is transmitted and the timer value is re-initialized.

21. The arbitration module of claim 16, wherein a frame from the source port, if available, is transmitted before the timer value is modified.

22. The arbitration module of claim 16. wherein the timer value is pre-programmed by a processor.

23. The arbitration module of claim 16, wherein any frames received from other ports when the arbitrated loop is being held open, other than higher priority frames, are ignored.

* * * * *

UNITED STATES PATENT AND TRADEMARK OFFICE
CERTIFICATE OF CORRECTION

| | |
|---|---|
| PATENT NO. | : 7,822,057 B2 |
| APPLICATION NO. | : 12/191890 |
| DATED | : October 26, 2010 |
| INVENTOR(S) | : Frank R. Dropps et al. |

It is certified that error appears in the above-identified patent and that said Letters Patent is hereby corrected as shown below:

On the first page, in field (57), in column 2, under "Abstract", line 2, delete "fiber" and insert -- fibre --, therefor.

On page 3, in column 2, under "Other Publications", line 14, delete "fnom" and insert -- from --, therefor.

In column 2, line 18, delete "fire" and insert -- fibre --, therefor.

In column 4, line 17, delete "exclusively" and insert -- exclusively) --, therefor.

In column 4, line 46, delete "off" and insert -- or --, therefor.

In column 5, line 28, delete "CUSS" and insert -- CMOS --, therefor.

In column 5, line 36, delete "CL" and insert -- GL --, therefor.

In column 5, line 55-59, delete "Switch crossbar............ASIC 20." and insert the same on line 54, after "crossbar." as a continuation of same paragraph.

In column 6, line 7, delete "OP" and insert -- IOP --, therefor.

In column 6, line 50, delete "(TPORT)," and insert -- (TPORT) --, therefor.

In column 6, line 64, delete "FIFE" and insert -- FIFO --, therefor.

In column 7, line 12, delete "63A" and insert -- 69A --, therefor.

In column 7, line 52, delete "ands" and insert -- and --, therefor.

Signed and Sealed this
First Day of February, 2011

David J. Kappos
*Director of the United States Patent and Trademark Office*

CERTIFICATE OF CORRECTION (continued)
U.S. Pat. No. 7,822,057 B2

In column 8, line 1, delete "rears" and insert -- reads --, therefor.

In column 8, line 39, delete "LOP" and insert -- IOP --, therefor.

In column 8, line 42, delete "3341" and insert -- 334) --, therefor.

In column 8, line 46, delete "format;" and insert -- format) --, therefor.

In column 9, line 32, delete "332D" and insert -- 302D --, therefor.

In column 10, line 23, delete "TARE" and insert -- TARB --, therefor.

In column 12, line 55, in claim 22, delete "16." and insert -- 16, --, therefor.